(12) United States Patent
Da Cruz et al.

(10) Patent No.: US 10,072,358 B2
(45) Date of Patent: Sep. 11, 2018

(54) PROCESS FOR RECYCLING COMPOSITE MATERIALS

(71) Applicant: EMBRAER S.A., São José dos Campos—SP (BR)

(72) Inventors: Antônio Carlos Da Cruz, São José dos Campos (BR); Fábio Santos Da Silva, São José dos Campos (BR); Rafael Razuk Garcia, São José dos Campos (BR)

(73) Assignee: EMBRAER S.A., São José dos Campos (BR)

( * ) Notice: Subject to any disclaimer, the term of this patent is extended or adjusted under 35 U.S.C. 154(b) by 285 days.

(21) Appl. No.: 14/944,723

(22) Filed: Nov. 18, 2015

(65) Prior Publication Data

US 2016/0153123 A1 Jun. 2, 2016

(30) Foreign Application Priority Data

Nov. 19, 2014 (BR) .............................. 102014028832

(51) Int. Cl.
*D01F 9/12* (2006.01)
*B01D 53/78* (2006.01)
(Continued)

(52) U.S. Cl.
CPC .............. *D01F 9/12* (2013.01); *B01D 53/32* (2013.01); *B01D 53/323* (2013.01); *B01D 53/44* (2013.01); *B01D 53/78* (2013.01); *C08G 85/008* (2013.01); *C10B 53/07* (2013.01); *B01D 2259/818* (2013.01); *Y02P 20/143* (2015.11)

(58) Field of Classification Search
CPC .............. B01D 2259/818; B01D 53/32; B01D 53/323; B01D 53/44; B01D 53/78; C08G 85/008; C10B 53/07; D01F 9/12
See application file for complete search history.

(56) References Cited

FOREIGN PATENT DOCUMENTS

EP 0360171 3/1990

OTHER PUBLICATIONS

Pimenta et al; Recycling carbon fibre reinforced polymers for structural applications: Technology review and market outlook, Waste Management 31 (2011) 378-392.

*Primary Examiner* — Renee Robinson
*Assistant Examiner* — Derek N Mueller
(74) *Attorney, Agent, or Firm* — Nixon & Vanderhye P.C.

(57) ABSTRACT

The present patent of invention describes a recycling process to recover fibrous reinforcing material of composite materials, particularly carbon fiber, primary reactor compound (101), for the controlled pyrolysis and oxidation of the composite material matrix (resin) at low temperature (400° C. to 500° C.) and a system for treating waste gases produced by thermal decomposition of composite material matrixes which employs a secondary reactor (201), containing within the same a thermal plasma arc (211). The main characteristic of the process, within the scope of the carbon fiber recycling, is the possibility of maintaining the fabric web, obtaining fabrics made of pure carbon fiber, without a significant amount of residues and preserving their structural characteristics. The thermal plasma allows managing high temperatures (2,000° C. to 15,000° C.) in a controlled atmosphere, which allows the dissociation of long chains of molecules into ions that are recombined to produce combustible gases and other acid or alkaline gases that are easily neutralized and retained in gas cleaning systems.

13 Claims, 6 Drawing Sheets

(51) Int. Cl.
*B01D 53/32* (2006.01)
*C08G 85/00* (2006.01)
*C10B 53/07* (2006.01)
*B01D 53/44* (2006.01)

PROCESS FOR RECYCLING COMPOSITE MATERIALS

This application claims priority to BR Patent Application No. 102014028832-5 filed 19 Nov. 2014, the entire contents of which is hereby incorporated by reference.

The present invention refers to a process for recycling composite materials, in particular for the recovery of fibers of the composite material from controlled pyrolysis and oxidation of resin of this material, and to a system for treating waste gases produced by thermal decomposition of the resin during the recycling of composite materials.

DESCRIPTION OF THE STATE OF THE ART

Composites are formed by mixtures of different materials, namely: a polymeric matrix or resin, a fibrous reinforcement (carbon fiber, glass fiber, aramid fiber) and, in some cases, filling agents.

As known in the art, composite materials having a polymeric matrix represent an alternative to metal structures, widely used by the aviation industry. These materials present a wide variety of combinations of matrixes and reinforcements, which provide them with characteristics of mechanical strength and specific stiffness allowing structural application thereof.

The carbon fiber technology, particularly, has been evolving quickly in the last few years, resulting in benefits involving a variety of high performance reinforcement options. The most important characteristic of the carbon fiber is the high elasticity module, higher than that of the other reinforcement fibers.

However, the production pare wastes and the end-of-life or non-conformant parts are not sustainably disposed, since these materials are usually sent to industrial landfills or incinerators for final disposal.

Accordingly, recycling is one of the most intelligent manners of managing the wastes since it creates jobs, is not harmful to the environment it and stimulates product reuse.

However, compounds are frequently manufactured in combination with other materials such as, for instance, parts using honeycomb type cores to reduce weight and cost. Metal inserts are also used to facilitate the fixation of the other components. Such combinations hinder the recycling process of the composite material components. In addition to these specific problems, there are other problems associated with the recycling of any end-of-life material such as the need of being capable of coping with the contamination and with the difficulties of collecting, identifying, selecting and separating the scrap material.

Therefore, the recycling process of composite materials is a poorly developed field within the industries throughout the world. However, since it is a material of high market value, carbon fiber is an interesting material to be recovered through recycling, and this is feasible as long as its mechanical characteristics are maintained with little modifications. Furthermore, composite material recycling must be performed with utmost caution, since the degradation of polymeric materials can generate polluting gases and soot.

Several processes have already been suggested for this recycling such as: mechanical grinding, solvolysis, microwaves, fluidized bed, combustion and pyrolysis. International studies indicate that pyrolysis is the most suitable process from a commercial perspective; however, the gas and remnant emission of traditional pyrolysis represent an unresolved environmental liability. This is because the thermal decomposition of the polymeric matrix of composite materials and of some fillers, at temperatures below 900° C., produces a large amount of gases and soot with carcinogenic properties.

Therefore, the use of recycling processes is needed for recovering not only the fibrous reinforcement but also to treat the emissions produced through thermal degradation.

OBJECTIVES OF THE INVENTION

Hence, the present invention aims to provide a recycling process for composite materials capable of recovering the fibers deriving from parts of composite materials or polymer-preimpregnated fabrics.

Another objective of this invention is the provision of a system for treating waste gases produced by thermal decomposition of the composite material matrixes during recycling of these composite materials.

Brief Description of the Invention

Thus, the object of the present invention is a process for recycling composite materials, which involves the following steps:

(i) preparing composite materials and placing them into a primary reactor;

(ii) composite material pyrolysis in the primary reactor obtaining fibers with soot residues; and (iii) oxidation of the fibers with soot residues obtaining recovered fibers.

A further subject of this invention is a system for treating waste gases produced by thermal decomposition of composite material matrixes, which comprises: a secondary reactor that receives the waste gases and the reagent gases, performs a ionization of the waste gases and a subsequent recombination of ions with each other and with the reagent gases, producing combustible gases and neutralizable gases; a combustion chamber that receives and burns combustible gases produced by the secondary reactor; a gas washer that receives and wash neutralizable gases; and an exhaust array consisting of an exhauster associated with a flue which expels neutralized gases into the atmosphere.

BRIEF DESCRIPTION OF THE DRAWINGS

A more detailed description of the present invention will be given below, based on one embodiment shown in the drawings. The figures show the following.

DETAILED DESCRIPTION OF THE INVENTION

According to one preferred embodiment and as shown in FIGS. 1 to 8, the present invention refers to a process for recycling composite materials 100 and to a system for treating waste gases 200 produced by thermal decomposition of composite material matrixes.

The process for recycling composite materials 100 aims to recover composite material fibers in order to preserve the mechanical and structural characteristics of this fiber, allowing to maintain the web of the processed fabric. Composite materials are those consisting of a polymeric matrix and a reinforcement made of fibers which may be carbon, glass and aramid fibers, and also fibrous materials impregnated with resin, thermoset and thermoplastic composites.

Figure 1:
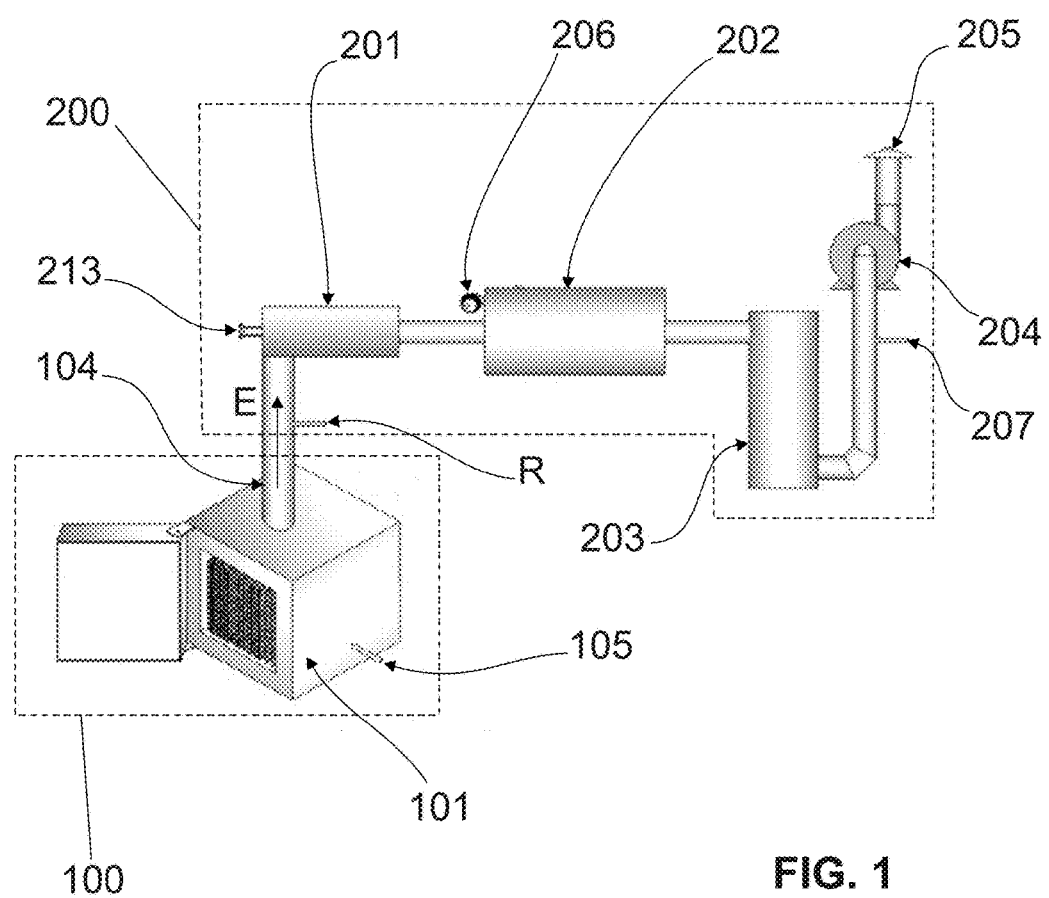
FIG. 1—is a schematic view of the process for recycling composite materials and of the system for treating waste gases generated in the recycling process.
Figure 2:
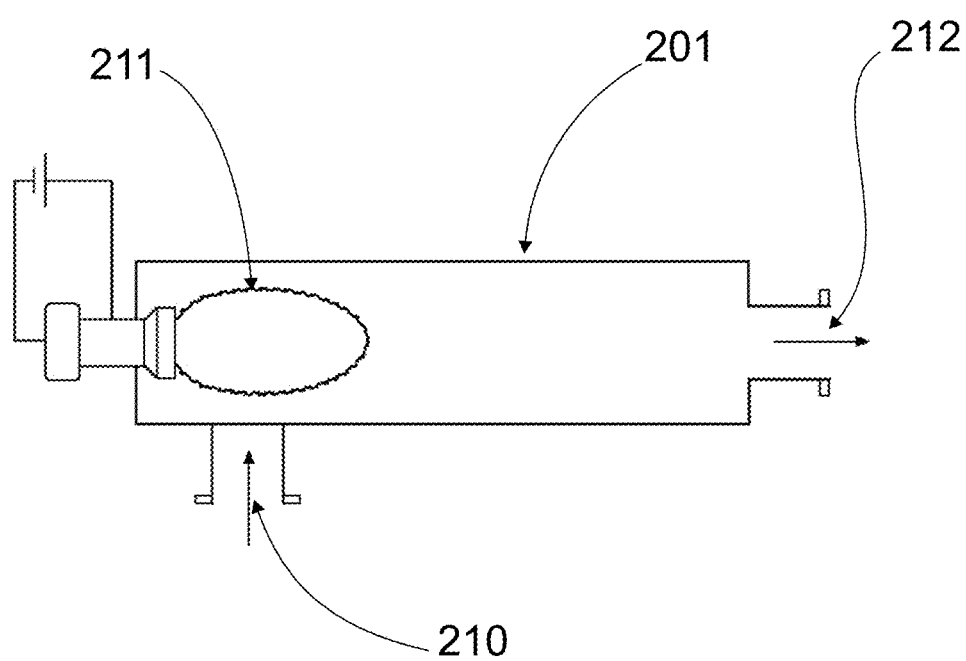
FIG. 2—is a schematic view of the reactor comprised in the system for treating waste gases.
Figure 3:
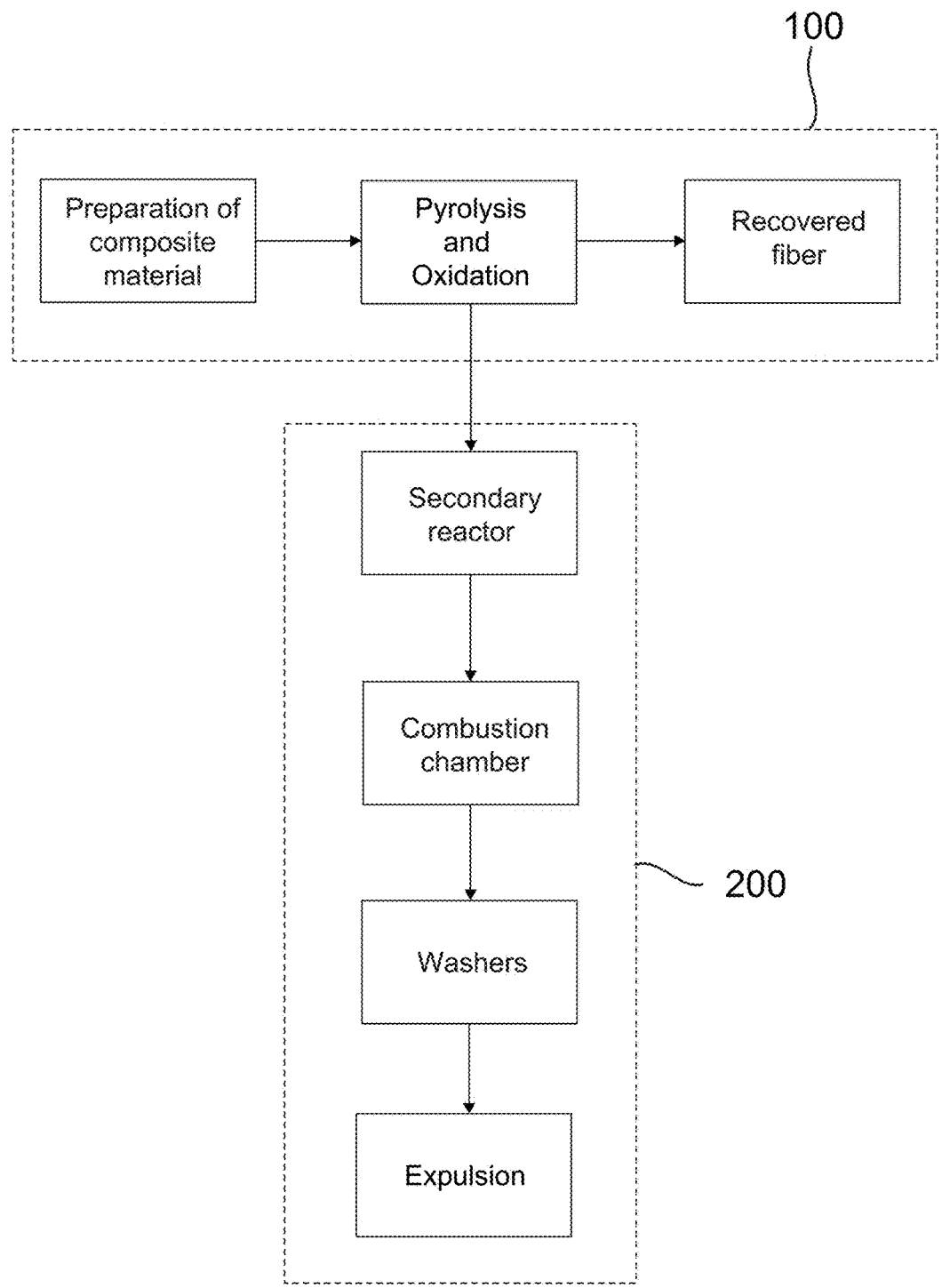
FIG. 3—is a flowchart of the process for recycling composite materials.
Figure 4:
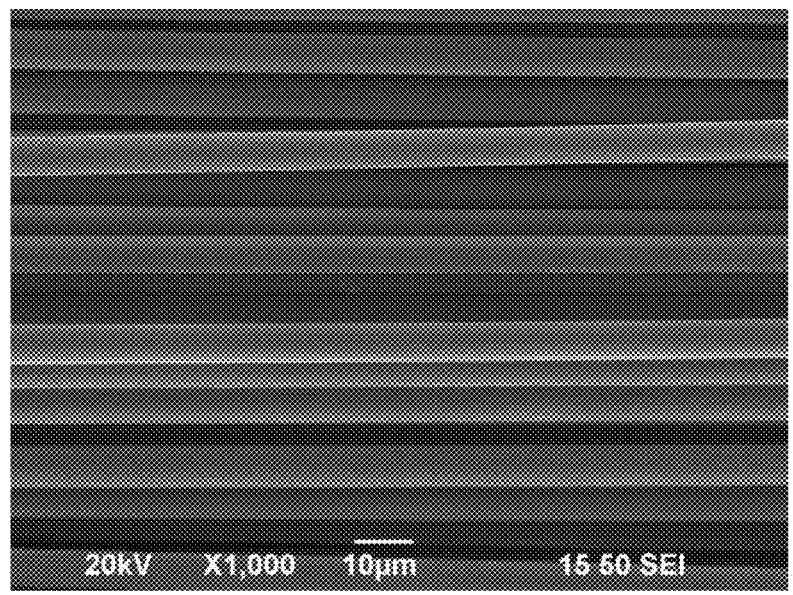
FIG. 4—is an image of the carbon fiber recovered through the process for recycling composite materials, magnified 1000 times.
Figure 5:
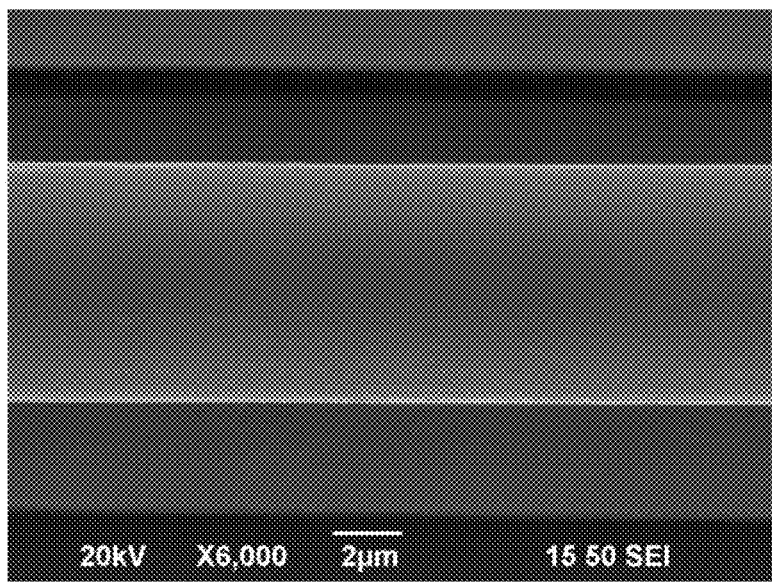
FIG. 5—is an image of a carbon fiber recovered through the process for recycling composite materials, magnified 6000 times.
Figure 6:
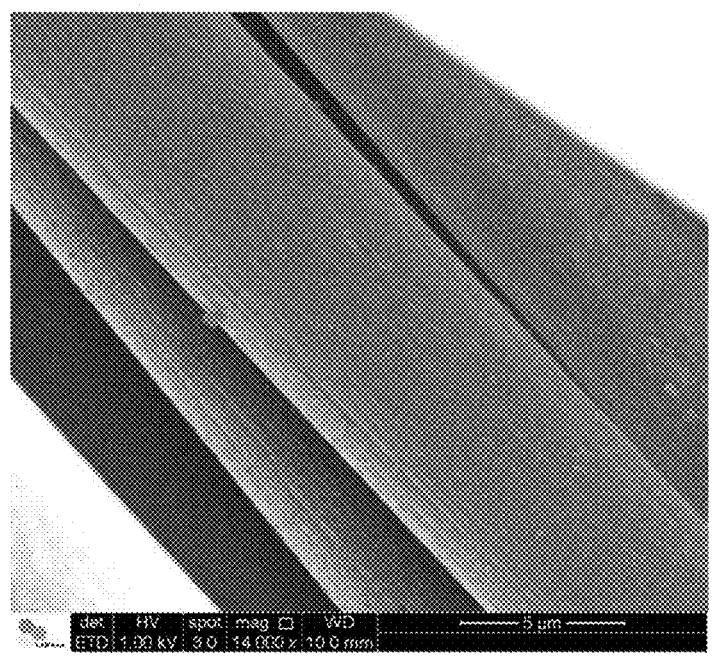
FIG. 6—is an image of a carbon fiber recovered through the process for recycling composite materials, magnified 14000 times.
Figure 7:
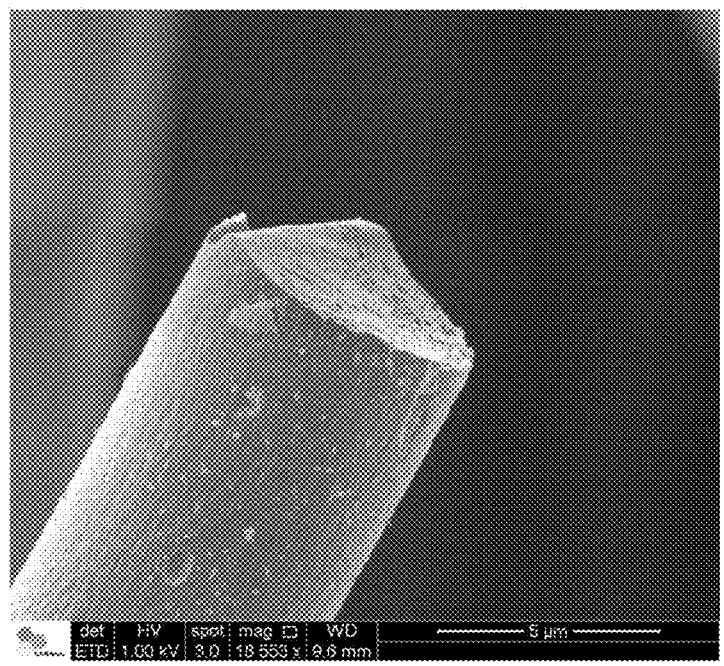
FIG. 7—is an image of a carbon fiber tip recovered through the process for recycling composite materials, magnified 14000 times.

According to FIGS. 1 to 3, this process begins with the preparation of composite materials deriving from remnants of production processes, rejected parts, end-of-life composites and by placing them into a primary reactor 101, without being ground.

Upon confinement in the primary reactor 101, a reagent gas is added through a reagent gas insertion point 105 and the composite material is heated at a temperature ranging between 400° C. and 600° C., in a controlled atmosphere, using nitrogen gas ($N_2$) injection, which makes internal pressure slightly higher than the atmospheric pressure, only with the purpose of preventing atmospheric gases to flow into the primary reactor 101. More precisely, the temperature inside the primary reactor 101 is maintained at 500° C., with fluctuations of ±20° C. for a period varying between 30 and 40 minutes. This is the pyrolysis step, which aims to gasify the components of the elements constituting the polymeric matrix of the composite material, leaving only soot residues on the fiber surface.

Upon completion of the pyrolysis, the fiber with soot residues is removed from the primary reactor 101 and undergoes a washing step. In this step, the fiber is immersed in deionized water that is absorbed by a carbonaceous matrix remaining on the fiber.

Upon completion of this washing step, the fiber with soot residues and now having adsorbed deionized water returns to the primary reactor 101 for the oxidation step. In this case, the adsorption of deionized water by the fiber provides a homogeneous oxidation. This is due to the fact that, once the fiber is confined again in the primary reactor 101, the fiber is heated to a temperature ranging between 350° C. and 450° C., more specifically 400° C., and it may fluctuate of ±15° C., for a period varying between 30 and 40 minutes, thereby occurring the oxidation of the residual carbon still remaining on the fiber surface after the pyrolysis step Hence, the suggested process 100 allows fiber recovery, maintaining the mechanical and structural characteristics thereof, allowing the reuse of the recovered fiber in several internal applications such as, for instance: tools, jigs and even aircraft parts of less structural import, as well as the marketing of these recovered fibers. The process 100 also allows that the parts used for recycling have a satisfactory size for a good quality of the recovered fiber, not requiring an excessive fiber destruction by trituration at the beginning of the process.

Accordingly, FIGS. 4 to 7 show images of the recovered fiber at different magnifications, proving the physical integrity of this fiber after the recycling process described herein.

Figure 8:
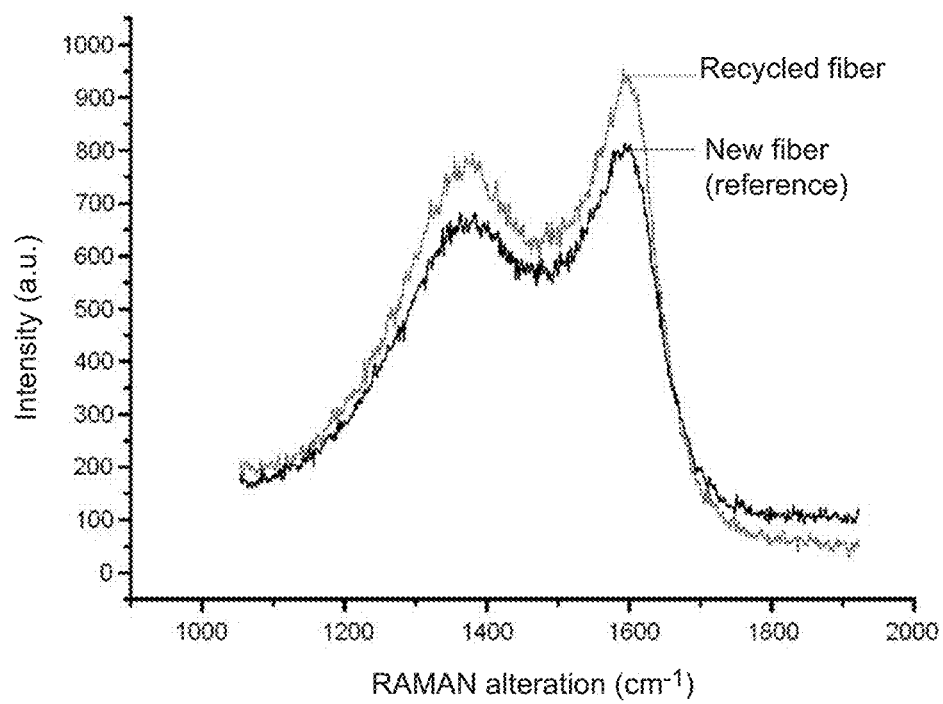
FIG. 8—shows Raman spectrum graphs drawn with new fiber filaments (reference) and recycled fiber filaments.

FIG. 8 shows the Raman spectra performed with new fiber filaments (reference) and recovered fiber filaments. The result confirms that the process maintains the structural integrity of the fiber and indicates the same molecular composition of the analyzed fibers.

The spectra of FIG. 8 are characteristic of carbon fiber made only of carbon, show peaks in the D (1345 cm-1) and G (1560 cm-1) bands and were obtained through argon ion laser ($\lambda$=514 nm).

The amplitude difference, perceived from the intensity of the curve in the spectrum of FIG. 8, is not related to the fiber structure, but rather to differences in the alignment of the laser of the device. What matters in this analysis is the position and the repetition of the peaks.

The band ratio (ID/IG), perceived in FIG. 8, can be considered as a measure of the crystalline order of carbon materials. Based on the evidence showing slight differences in the ID/IG indexes, it is concluded that the treatment did not modify the graphitic structure of the carbon fiber samples.

Although process 100 presents the advantage of recycling composite materials and recovering the fibers of those materials maintaining the mechanical characteristics of that fiber, during the pyrolysis step, when the thermal decomposition of the polymeric matrixes of the composite material takes place, waste gases are expelled and released from the primary reactor 101. Such gases, deriving from composite material degradation, are atmospheric pollutants.

Accordingly, the system for treating waste gases 200 produced by thermal decomposition of composite material matrixes has the function of treating such gasses in order to prevent the expulsion of toxic and/or polluting gases into the atmosphere.

Therefore, as shown in FIGS. 1 and 3, waste gases W of the process for recycling composite materials 100 are conveyed to a secondary reactor 201 through a pipework 104 which connects the primary reactor 101 to the secondary reactor 201. In this tabulation 104, reaction gases R are added.

As shown in FIG. 2, waste gases W and reagent gases R flow in the secondary reactor 201 through an inlet 210 and flow through a plasma arc 211 feed by a plasma torch 213, being thereafter ionized at a temperature ranging between 2,000° C. and 15,000° C. and directed towards an outlet 212 of the secondary reactor 201. Due to the high temperatures, when the waste gases W and the reagent gases R flow through the plasma arc 211, the chemical bonds between the atoms of the molecules constituting these gases are broken and transformed into ions of their constituting elements.

Upon ionization of these gases, the ions follow to a chamber 201, wherein, by controlling the pressure and temperature of the composition, with the aid of the injection of reagent R in the gaseous stream, the ions are combined between them producing molecules of combustible gases C, for instance, hydrogen ($H_2$) and carbon monoxide (CO), inert gases such as carbon dioxide ($CO_2$), or neutralizable gases N which are acid or alkaline gases deriving from reactions between hydrogen ($H^+$) and oxygen ($O^{-2}$) ions with sulfur ($S^{-2}$), fluorine ($F^-$), chlorine ($Cl^-$), boron ($B^{+3}$) and others.

The produced combustible gases C are burned or oxidized in a combustion chamber 202 with the help of a pilot burner 206, whilst neutralizable gases N are neutralized in a gas washer 203.

Once they are oxidized and washed, the gases are neutralized and prepared to be expelled into the atmosphere. A gas sampling point 207 allows the removal of neutralized gas samples before their passage through an exhaust set.

This exhaust set consists of an exhauster 204 which performs the suction of the neutralized gases and expels them into the atmosphere through a flue 205 associated with the exhauster 204.

As for the plasma, this is characterized for being a source of heat which provides high temperatures (between 2,000 and 15,000° C.) and allows the control of the atmosphere of the environment where it is confined since it does not use a fuel as a source of energy but rather an electric discharge. Therefore, this process represents a suitable manner to process gases and particulates deriving from the thermal decomposition of the components of the composite materials.

The plasma state is known as the fourth state of matter. For instance, if thermal energy is supplied to a block of ice, water ($H_2O$) in the solid state ($1^{st}$ state of matter), its molecules will agitate until passing from the solid to the liquid state ($2^{nd}$ state of matter). By supplying more energy (heat) to this water in the liquid state, its molecules will agitate even more passing to the gaseous state ($3^{rd}$ state of matter). If more energy is supplied to the water in the gaseous state, its molecules will agitate even more until they separate into ions of its constituting elements (in the case of water, $H^+$ and $O^{-2}$), and this is the plasma state of water ($4^{th}$ state of matter). The plasma state is described as ions dispersed in a fluid. The reactions deriving from an electric discharge in a gaseous medium at pressures higher than the atmospheric pressure promote high temperatures, and this allows rising any gas present in this medium to its plasma state.

Upon a gas being raised to the plasma state, at a controlled atmosphere, it is possible to control a reactor to provide favorable means to the recombination of those ions to produce molecules other than those of the original gas.

The fact that system 200 uses thermal plasma for treating toxic gases produced by the thermal decomposition of composite materials is a differential element introduced by the present development which allows recycling of composite materials and resolves the problem of waste gases produced generates in that recycling, eliminating the environmental liability known to date.

Although a preferred example of embodiment has been described, it should be understood that the scope of the present invention covers other possible variations, being only limited by the content of the attached claims, including thereby the possible equivalents thereof.

The invention claimed is:

1. A process for recycling a composite material, wherein the process comprises the following steps:
   (i) providing a composite material comprised of fibers to be recovered and a polymeric matrix;
   (ii) placing the composite material into a primary reactor and conducting pyrolysis of the composite material in the primary reactor to obtain the fibers with a soot residue of the polymeric matrix;
   (iii) washing the fibers with the soot residue with deionized water to separate the soot residue from the fibers and to allow the deionized water to be absorbed by the fibers; and
   (iv) oxidizing the fibers comprising absorbed deionized water by heating the fibers comprising absorbed deionized water in the presence of an oxidizing gas stream to thereby obtain recovered fibers.

2. The process according to claim 1, wherein the pyrolysis step (ii) comprises confining the composite material in the primary reactor at a controlled atmosphere, and heating the confined composite material at temperatures ranging between 400° C. and 600° C. for a period varying between 30 and 40 minutes.

3. The process according to claim 2, wherein the pyrolysis step (ii) includes a step of gasifying components of a polymeric matrix of the composite material.

4. The process according to claim 1, wherein the oxidizing step (iv) is practiced at a temperature ranging between 350° C. and 450° C.

5. The process according to claim 1, wherein the pyrolysis step (ii) includes expelling waste gases from the primary reactor.

6. The process according to claim 1 wherein the composite material comprises at least one type of fibers selected from the group consisting of carbon fibers, glass fibers and aramid fibers.

7. The process according to claim 6, wherein the polymeric matrix further comprises a filler.

8. A process for recovering carbon fibers from a carbon fiber-containing composite material, wherein the process comprises the steps of:
   (i) placing a composite material comprising carbon fibers in a polymeric matrix into a primary reactor;
   (ii) conducting pyrolysis of the composite material in the primary reactor to obtain carbon fibers having a surface residue of pyrolyzed matrix material soot;
   (iii) washing the fibers with the surface soot residue with deionized water to remove the soot residue from the surface of the carbon fibers and to allow the deionized water to be absorbed by the carbon fibers; and
   (iv) oxidizing the carbon fibers comprising absorbed deionized water by heating the carbon fibers comprising absorbed deionized water in the presence of an oxidizing gas stream to thereby recover the carbon fibers.

9. The process according to claim 8, wherein the pyrolysis step (ii) comprises confining the composite material in the primary reactor at a controlled atmosphere, and heating the confined composite material at temperatures ranging between 400° C. and 600° C. for a period varying between 30 and 40 minutes.

10. The process according to claim 9, wherein the pyrolysis step (ii) includes a step of gasifying components of a polymeric matrix of the composite material.

11. The process according to claim 8, wherein the oxidizing step (iv) is practiced at a temperature ranging between 350° C. and 450° C.

12. The process according to claim 8, wherein the pyrolysis step (ii) includes expelling waste gases from the primary reactor.

13. The process according to claim 8, wherein the matrix further comprises a filler.

* * * * *